United States Patent [19]

Austin

[11] Patent Number: 5,147,125
[45] Date of Patent: Sep. 15, 1992

[54] MULTILAYER ANTI-REFLECTION COATING USING ZINC OXIDE TO PROVIDE ULTRAVIOLET BLOCKING

[75] Inventor: R. Russel Austin, Novato, Calif.
[73] Assignee: Viratec Thin Films, Inc., Faribault, Minn.
[21] Appl. No.: 398,136
[22] Filed: Aug. 24, 1989
[51] Int. Cl.$^5$ ............................................. G02B 5/28
[52] U.S. Cl. ................................... 359/359; 359/589
[58] Field of Search .............. 350/1.6, 1.7, 311, 164, 350/165, 166

[56] References Cited

U.S. PATENT DOCUMENTS

| | | | |
|---|---|---|---|
| 1,536,919 | 5/1925 | Parkinson | 351/163 X |
| 1,634,182 | 6/1927 | Gell et al. | 350/1.1 X |
| 2,220,861 | 11/1940 | Blodgett | 350/165 |
| 3,432,225 | 3/1969 | Rock | 350/166 X |
| 3,499,775 | 3/1970 | Albinak | 106/47 |
| 3,565,509 | 2/1971 | Sulzbach | 350/164 |
| 3,781,090 | 12/1973 | Sumita | 350/164 |
| 3,960,441 | 6/1976 | Kamiya | 350/164 |
| 4,006,378 | 2/1977 | Silverstein et al. | 350/1.7 X |
| 4,260,222 | 4/1981 | Kozawa | 350/164 |
| 4,387,960 | 6/1983 | Tani | 350/164 |
| 4,422,721 | 12/1983 | Hahn et al. | 350/164 |
| 4,701,425 | 10/1987 | Baker et al. | 501/70 |

OTHER PUBLICATIONS

Minami, T., Nanto, H. and Takata, S., "Optical Properties of Aluminum Doped Zinc Oxide Thin Films Prepared by R. F. Magnetron Sputtering", *Japanese Journal of Applied Physics*, vol. 24, No. 8, Aug. 1985 pp. L605–L607.
Lockhart, L., and King, P. "Three-Layered Reflection Reducing Coatings" *Journal of the Optical Society of America*, vol. 37, No. 9, Sep., 1947 pp. 689–694.
MacLeod, H. A. *Thin-Film Optical Filters*, 2nd Edition, Macmillan Publishing Co. New York, 1986 QC 373.L5 M3 pp. 94–123.

*Primary Examiner*—Bruce Y. Arnold
*Assistant Examiner*—David R. Parsons
*Attorney, Agent, or Firm*—Heller Ehrman White & McAuliffe

[57] ABSTRACT

A multilayer, thin-film, broad-band, anti-reflection structure applicable to transparent substrates. The present invention makes use of the UV absorption properties of zinc oxide to provide UV rejection for wavelengths shorter than 380 nm, while providing anti-reflection properties in the visible region of the spectrum. The structure provides a reflection value less than 0.25% in the visible region of the spectrum, and blocks 99 percent of UV radiation below 380 nm.

15 Claims, 9 Drawing Sheets

FIG.−1 (PRIOR ART)

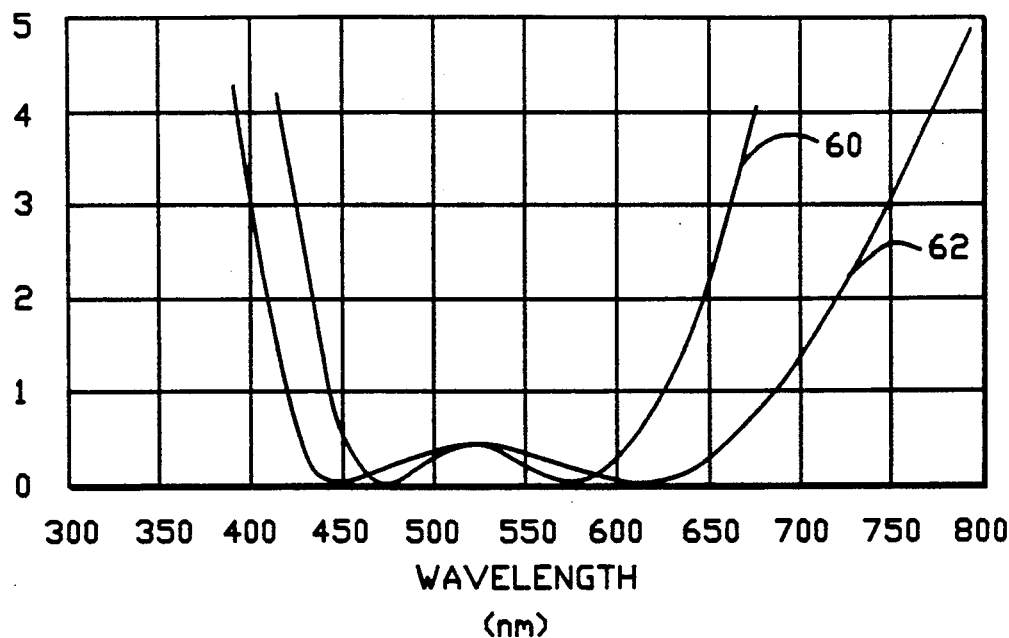
FIG.—5
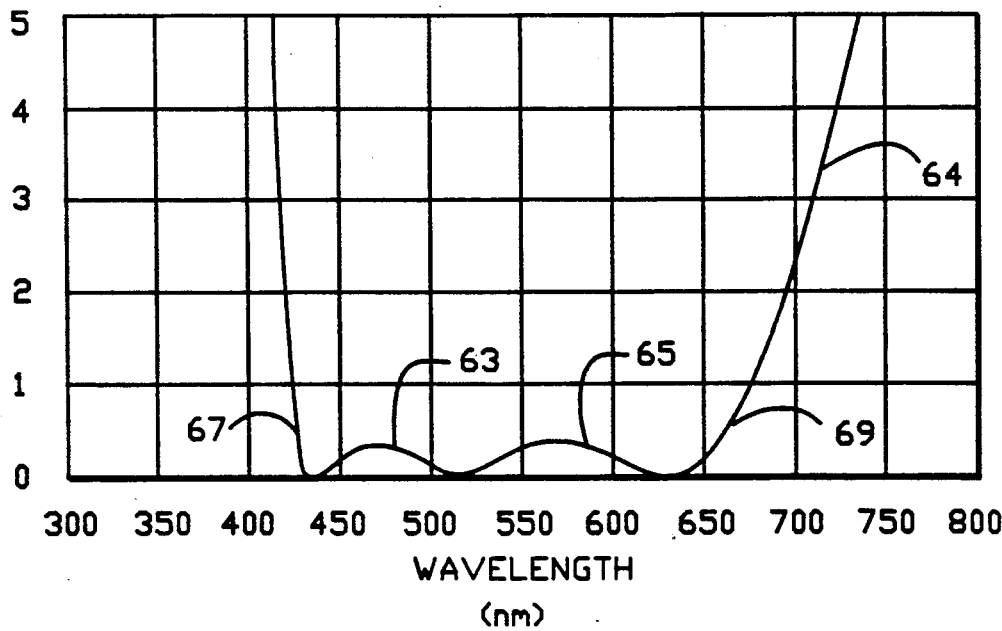
FIG.—6A

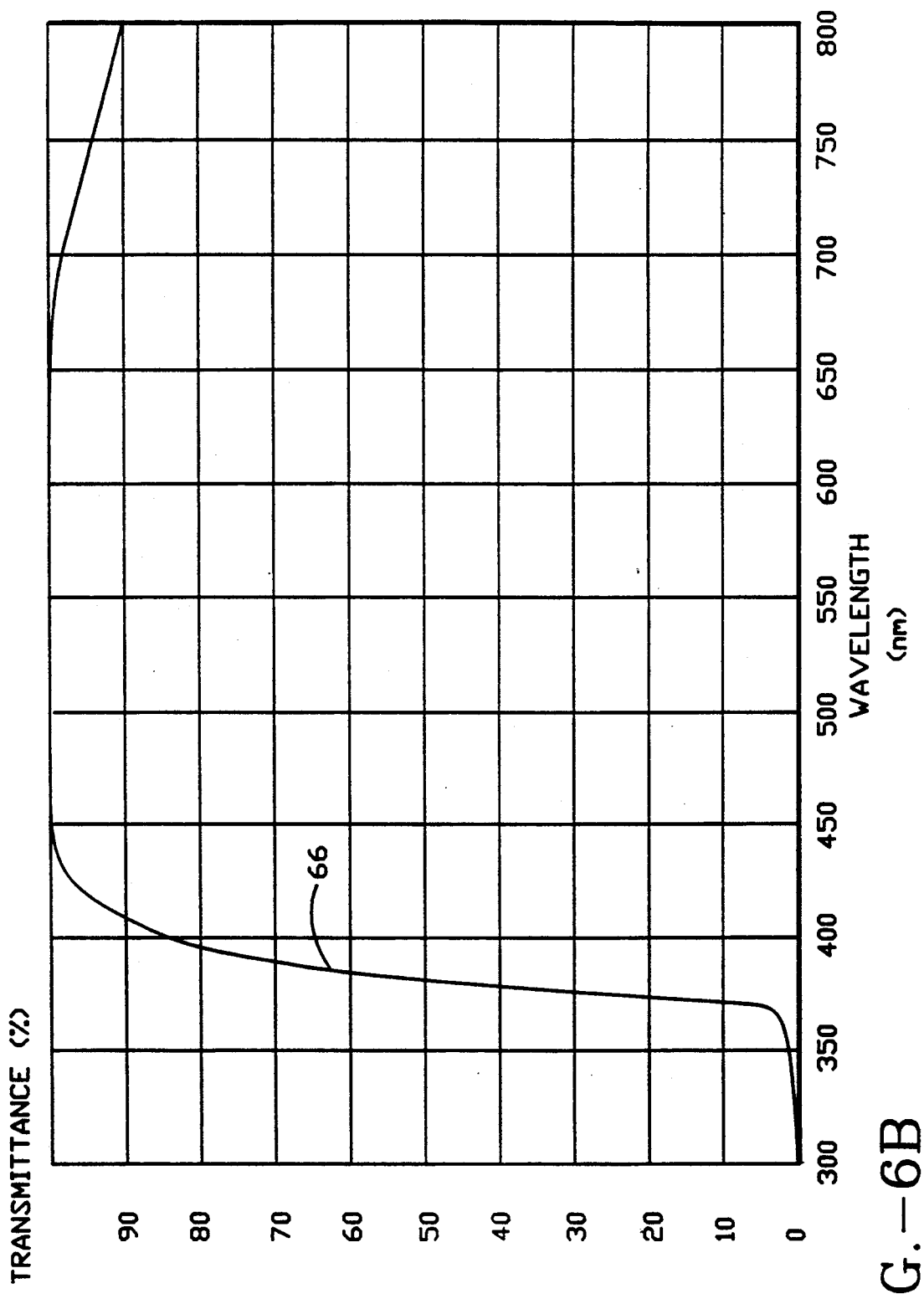
FIG.—6B

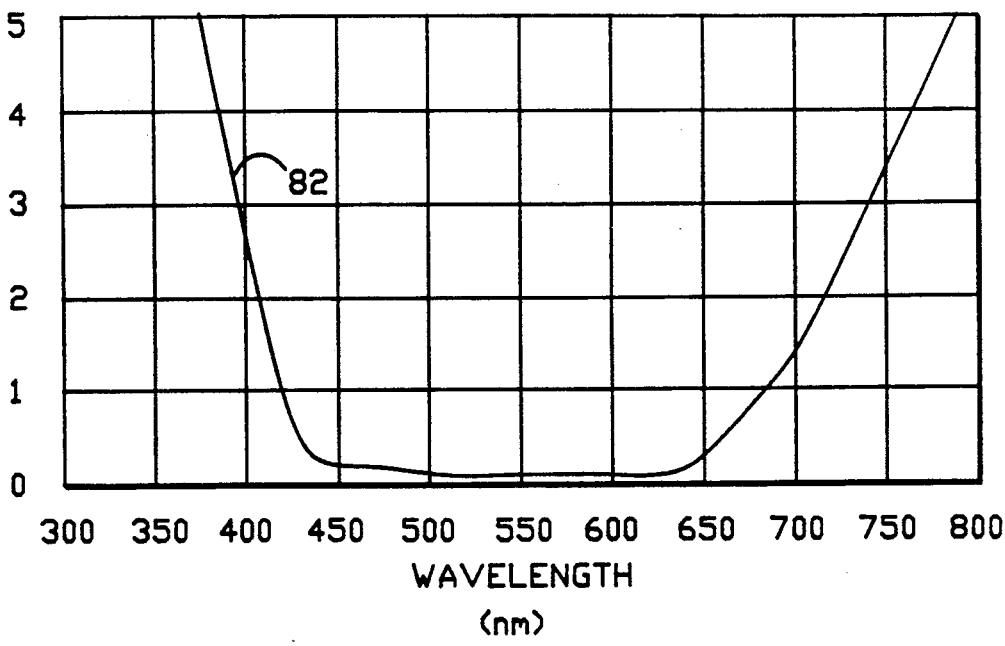
FIG.—10
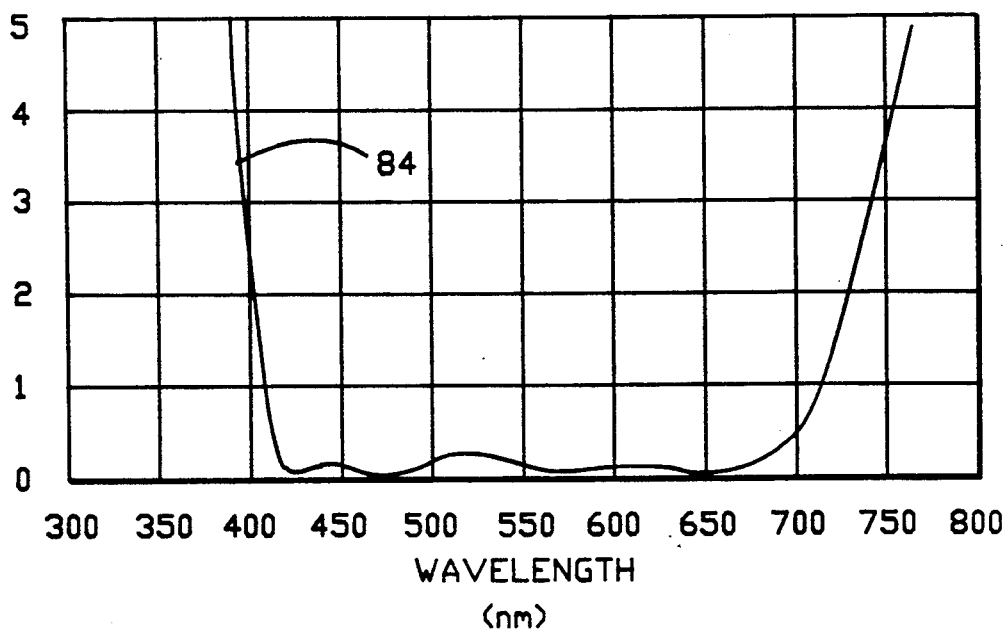
FIG.—11

MULTILAYER ANTI-REFLECTION COATING USING ZINC OXIDE TO PROVIDE ULTRAVIOLET BLOCKING

BACKGROUND OF THE INVENTION

1. Field of the Invention

The present invention relates generally to anti-reflection and ultraviolet radiation blocking coatings, and more particularly to such a coating utilizing zinc oxide.

There are several areas where it is desirable to have a clear, colorless, transparent surface that is anti-reflective and rejects ultraviolet (UV) radiation. For instance, low reflection, UV blocking glass may be utilized in glazings for framing and conservation of fine art and photographic works. Such glass could also be used for vision correcting lenses. The range of applications of this type of glass would be more extensive if the anti-reflection and UV rejection properties could be imparted to the glass at a reasonable cost.

Additionally, it is desirable to achieve the anti-reflection and UV blocking properties without imparting color to the transparent surface. It also advantageous to provide such properties with a coating on only one side of the transparent surface. For economic considerations, it is preferred that the coating be deposited on a large scale by DC magnetron sputtering equipment of the type typically used for coating architectural glass.

All UV radiation is damaging to the eyes, upholstery, and works of art such as paintings and photographs. The radiation becomes less damaging at longer wavelengths, but over extended periods even the long wavelengths, i.e. light in the violet region of the visible spectrum, will cause fading of certain pigments. Likewise, shorter exposures to the shorter UV wavelengths cause damage. Accordingly, it is desirable to extend the UV blocking region as far as possible towards the visible spectrum, definitely as far as wavelengths of 380 nanometers (nm), without compromising visible light performance.

2. Description of the Related Art

Multilayer Anti-Reflection Coatings

There are many patents covering broad-band, multilayer, anti-reflection coatings. These patents cover variations of the three or four basic film structure, discussed in detail below, and they are typically directed to using mixtures of materials or substituting two or more films for one film to avoid using materials with a specific refractive index (n). See, e.g., U.S. Pat. Nos. 3,432,225; 3,565,509; and 4,260,222.

Other patents concern the addition of films to the basic structure or substitution of two or more films for a film in the basic structure for purposes of extending the effective spectral range. See, e.g., U.S. Pat. Nos. 3,781,090 and 3,960,441. One patent, U.S. Pat. No. 4,422,721, is directed to the incorporation of transparent conductive oxide films, such as indium tin oxide, into the basic structure for purposes of heating the coated object, bleeding-off static electricity, and preventing penetration of electromagnetic radiation at radio and microwave frequencies.

UV Absorbing Glass

Most common plate glasses and optical glasses absorb UV radiation to some extent. Common soda lime glass, for example, begins to absorb in the violet region of the spectrum but the absorption increases only gradually. Glass utilized for art glazings, frequently 2 millimeters (mm) thick, does not absorb UV radiation completely until 320 nm.

Certain metal oxides can be incorporated into glass formulations to impart UV blocking properties. The most-utilized materials are cerium oxide, titanium oxide, neodymium oxide, and erbium oxide. Such formulations are varied and complex, but the overriding problems in designing the formulations are similar.

Not all oxides can be accommodated in a glass matrix. Some oxides may be accommodated, but only in certain proportions, and/or in the presence of other components which may be undesirable for the purpose for which the glass is to be used. Invariably, materials suitable for effectively blocking long wavelength UV radiation, e.g. greater than 400 nm, will also absorb visible radiation, and thus add color. This happens either as a result of their effect on the glass structure or due to the presence impurities in the oxides. This color may be neutralized by the addition of other components but at a loss of visible light transmission. In all instances, the increase in absorption with decreasing wavelengths is sufficiently gradual that complete blocking at wavelengths longer than 350 nm can not be accomplished without absorbing the blue portion of the visible spectrum and imparting a yellow transmission color to glass. U.S. Pat. Nos. 1,536,919; 1,634,182; 3,499,775; and 4,701,425 relate to the problems described above.

Plastics and Resins

The most-effective UV blocking materials produced in recent years have been specially-formulated plastics and resins. The typical performance of two different plastic materials, produced by the Rohm and Hass Company, Philadelphia, Pa., and designated UF 3 and UF 4, is shown in FIG. 1. The shorter wavelength blocking material UF 4 imparts no perceptible tint to the transmitted light. The longer wavelength blocking material UF 3 imparts a slight yellow tint.

Resin formulations are typically based on silicon siloxane resins containing appropriate additives. They are designed to be coated on glass by spinning or roll coating and then are heat cured. The performance of such products compares with the plastic materials UF 3 and 4.

The plastic and resin products have a steeper absorption edge, i.e. the change from UV blocking to transmitting, which is desirable, than UV absorption glass products. Both plastics and resins possess a basic disadvantage, however, in that they are relatively soft and thus will deteriorate under repeated cleaning. Therefore, they must be protected by placing them in assemblies laminated with glass, or by providing them with hard overcoatings. These measures add significantly to the cost of the finished product.

Multilayer UV Reflectors

It also possible to reject UV radiation using a UV reflector formed from a stack of alternating high and low refractive index UV transparent dielectric materials, for example titanium oxide ($TiO_2$) and silicon oxide ($SiO_2$). To reproduce the blocking level and the absorbing edge slope of the UF 4 material, e.g., requires at least seventeen individual films.

While the transmission of visible light through a UV reflector may be optimized by using the well-known long wavelength pass filter structure, a truly low reflection, typically less than 0.5%, can only be realized over a narrow portion of the visible spectrum. Additionally, it is not clear whether such a structure could be integrated into a broad-band, anti-reflection multilayer structure. Even were such a solution possible, there still remains the issues of economics and the compatibility with large scale, in-line sputtering operations.

UV Absorption by Thin Film Materials

Certain of the oxide materials discussed above in connection with UV absorbing glass could also absorb UV radiation in their pure form. This is certainly true for titanium oxide. This is a high refractive index material useful in certain types of multilayer, anti-reflection coatings, as will be discussed later.

Titanium oxide is a strong absorber of UV radiation, at least to the extent that significant absorption begins at a wavelength of about 450 nm. However, the increase in absorption with decreasing wavelength is very gradual. A typical value at 380 nm for the extinction coefficient k, the imaginary part of the so-called complex refractive index (n-ik) of UV absorbing materials, is 0.005. This is equivalent to an absorption coefficient of $16 \times 10^3$ cm$^{-1}$, which means that a film would need to be on the order of 10,000 nm thick to absorb 99% of the light at this wavelength. To put this in perspective, a film of $TiO_2$ with an optical thickness of one-half wavelength at 520 nm is approximately 110 nm thick. This is typical of the thickness of this material when used as a component multilayer, anti-reflection coatings.

Zinc Oxide

Zinc oxide (ZnO) is a material which is rarely, if ever, used in multilayer film structures deposited by thermal evaporation. This is primarily because of the availability of other materials with a higher refractive index which are just as easy to deposit and more durable. In the architectural glass coating field, however, where films are deposited by DC reactive sputtering from metal targets, ZnO is commonly used because of the high deposition rates that can be achieved.

The UV absorption edge of DC reactively-sputtered ZnO films is very steep with the extinction coefficient k rising very rapidly in the region from 400 nm to 380 nm. Following the sharp increase in absorption with decreasing wavelength, k becomes uniform at a value of approximately 0.4 at wavelengths between 370 and 300 nm. At this value, a film at least about 250 nm thick would cause transmission therethrough to fall below 99 percent at wavelengths for which the k value has reached a maximum. A ZnO film 250 nm thick is optically twice as thick as the thickest films used in conventional anti-reflection coating structures.

The refractive index of reactively-sputtered ZnO films in the visible region of the spectrum lie in the range between about 1.85 and 1.91. As will be shown, this value coupled with the thickness necessary to provide adequate UV absorption makes it impossible to incorporate them as film components in broad-band, anti-reflection film structures while providing the required level of UV absorption.

SUMMARY OF THE INVENTION

The present invention is directed to an anti-reflection coating on the surface of an article comprising one or more layers of zinc oxide having an optical thickness at a wavelength of about 520 nanometers of at least about six-tenths of a wavelength. The coating also includes an outer layer having a refractive index less than that of the surface of the article and an optical thickness at a wavelength of about 520 nanometers of about one-quarter of a wavelength. Additionally, the coating includes at least two additional layers wherein one of these layers has an index of refraction different from zinc oxide.

The coating may be formed on one or both surfaces of an article such as a transparent substrate.

The present invention provides a multilayer, thin-film, broad-band, anti-reflection structure applicable to transparent substrates. The structure utilizes the excellent UV absorption properties of zinc oxide films to provide UV rejection for wavelengths shorter than 380 nm, while providing anti-reflection properties in the visible region of the spectrum. The structure provides a reflection value less than 0.25% in the visible region of the spectrum, and blocks 99 percent of UV radiation below 380 nm.

BRIEF DESCRIPTION OF THE DRAWINGS

FIG. 5 is a graph illustrating reflectance values for the structures of FIGS. 4A and 4B.

FIGS. 6A and 6B are graphs illustrating the spectral performance of the structure of FIG. 4C.

FIG. 10 is a graph illustrating reflectance values for another embodiment of the present invention.

FIG. 11 is a graph illustrating reflectance values for yet another embodiment of the present invention.

DETAILED DESCRIPTION OF THE PREFERRED EMBODIMENTS

It is instructive to first consider the optical properties of zinc oxide (ZnO) films, particularly their UV absorption properties. Then it will be shown how the structure of the present invention was developed to enable the ZnO material to be incorporated therein to provide effective UV blocking.

The optical properties of DC magnetron sputtered zinc oxide films were determined by measuring the reflection and transmission values of films having an optical thickness of approximately one-quarter wavelength at a wavelength of between about 500 and 600 nm, i.e., in the middle region of the visible spectrum. The results are shown in Table 1.

TABLE 1

| Optical constants of sputtered zinc oxide films: | | | | |
|---|---|---|---|---|
| Wavelength | Baked | | Unbaked | |
| (nm) | n | k | n | k |
| 300 | 1.61 | 0.43 | 1.65 | 0.44 |
| 320 | 1.59 | 0.44 | 1.63 | 0.45 |

TABLE 1-continued

| Wavelength (nm) | Baked n | Baked k | Unbaked n | Unbaked k |
| --- | --- | --- | --- | --- |
| 340 | 1.57 | 0.45 | 1.65 | 0.46 |
| 360 | 1.62 | 0.47 | 1.67 | 0.35 |
| 380 | 1.75 | 0.12 | 1.74 | 0.09 |
| 400 | 1.84 | 0.00 | 1.85 | 0.03 |
| 420 | 1.88 | 0.00 | 1.89 | 0.02 |
| 500 | 1.90 | 0.00 | 1.91 | 0.00 |

Figure 2:
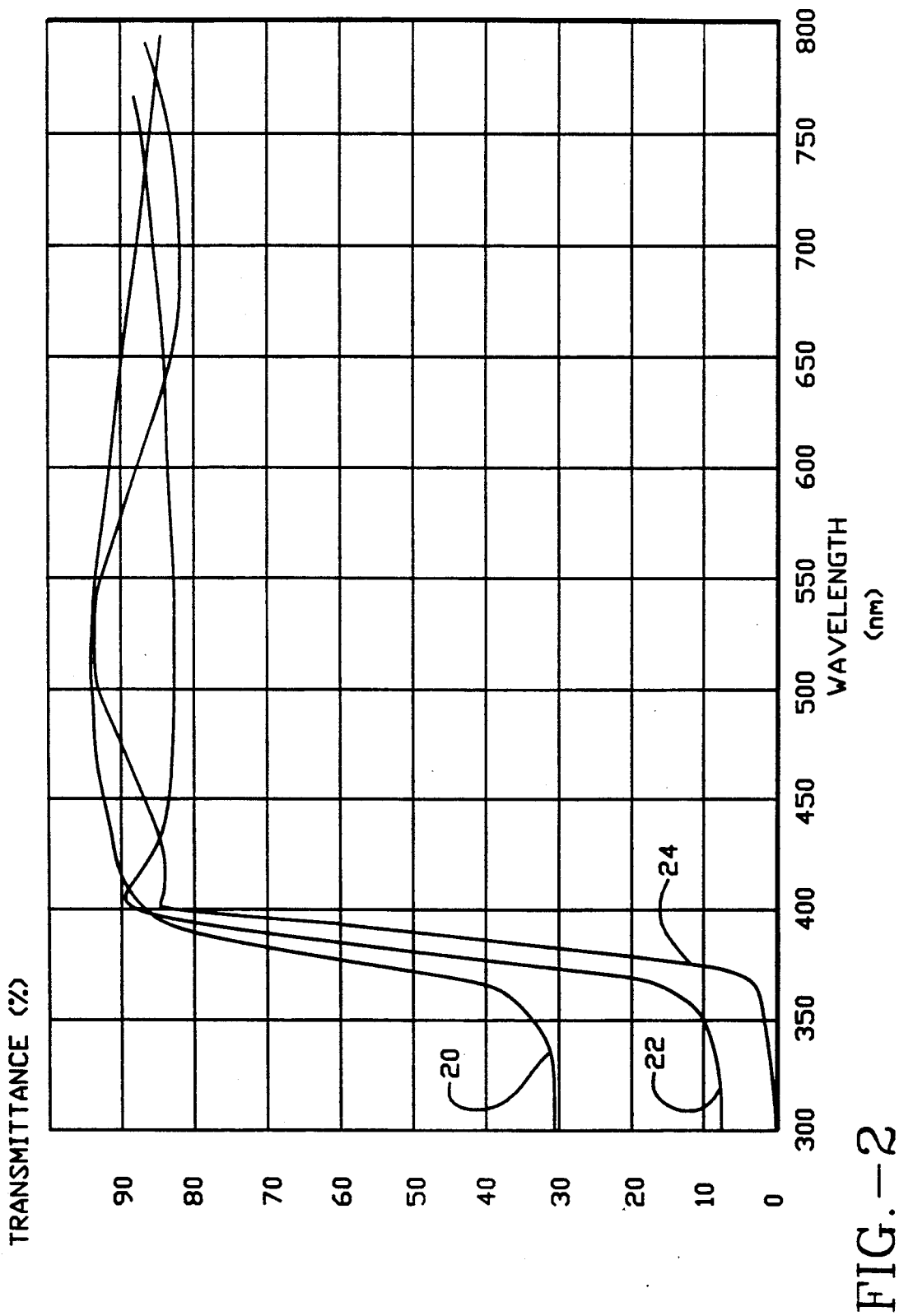
FIG. 2 is a graph illustrating transmission values for baked zinc oxide film of different thicknesses.

Values are shown for films as deposited (unbaked) and for baked films, i.e. those that have been heated after being deposited. The values shown in Table 1 are based on data for films heated at 450° C. for one hour in air. The persistence of UV absorption in the unbaked films into the visible spectrum is evident, as represented by the higher extinction coefficient k at wavelengths of 400 and 420 nm. It can also be seen that the baked films reach a maximum value of extinction coefficient k at a wavelength 20 nm longer than that of the unbaked films. FIG. 2 shows the transmission versus wavelength plots for baked zinc oxide films of different optical thicknesses at a wavelength of 520 nm. Specifically, curves 20, 22 and 24 represent such films having an optical thickness of one-quarter wavelength, one-half wavelength, and one-full wavelength, respectively. These curves were computed using the data in Table 1.

While both baked and unbaked films could be incorporated into an anti-reflection coating, clearly the baked films provide better UV absorption and transmission in the blue region of the visible spectrum, since the UV absorption edge is steeper. The properties of the baked films are thus used in computing the examples discussed herein. (The examples in the specification as well as the data graphically represented in FIGS. 2, 5–7 and 9–11 are computed values based on data experimentally verified for the materials of the various structures. Actual embodiments were not fabricated from which measurements were made.)

Although it has not been specifically determined, it is believed that the properties of zinc oxide films deposited by any of the other common deposition techniques, such as thermal evaporation, chemical vapor deposition, plasma-assisted chemical deposition, ion plating, and ion beam deposition will have similar UV absorption properties and refractive index values. Thus, the embodiments discussed below should accommodate zinc oxide films deposited by means other than DC magnetron sputtering.

Although the UV absorption properties of zinc oxide films are unique, it is believed that films comprising mixtures or compounds of zinc oxide with certain other dielectric materials may retain the essential UV absorption characteristics of zinc oxide, and therefore be useful in the present invention. For example, Minami et al in the *Japanese Journal of Applied Physics*, "Optical Properties of Aluminum Doped Zinc Oxide Thin Films Prepared by RF Magnetron Sputtering", Vol. 24, No. 8, August 1985, pp. L605–L607, teach that the wavelength location of the UV absorption edge may be influenced by small quantities of dopants such as aluminum. Such dopants may thus be utilized in the present invention.

A comprehensive discussion of the design principles of anti-reflection coatings for transparent substrates is provided in MacLeod, *Thin Film Optical Filters*, Chap. 3, pp. 94–123, 2d Ed. (1986). In the following discussion, certain of these principles pertinent to the present invention will be discussed. For instance, in describing multilayer structures, the convention has been adopted of numbering the films from the air boundary towards the substrate.

There are two important fundamental multilayer film structures which have been used for the production of broad-band, anti-reflection coatings on glass. As discussed, many modifications of these structures have been developed to circumvent the problem of requiring a single film with a refractive index value not available in a naturally-occurring material. Additional films or layers have been added to the basic three film structure as thicker films were subdivided into thinner films to simulate a refractive index or approximate a graded-refractive index.

Figure 3B:
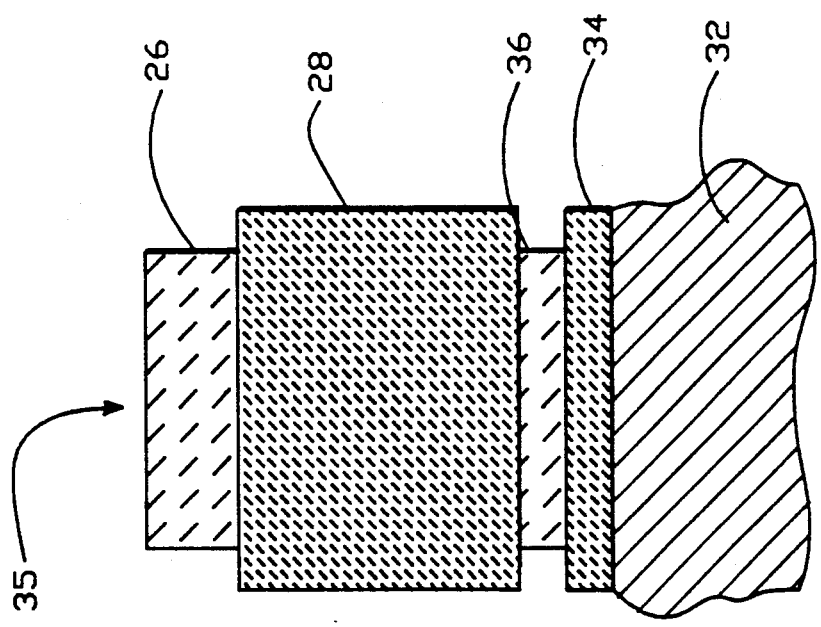
FIGS. 3A and 3B schematically illustrate a three layer, multilayer film structure and a modification thereof, respectively.
Figure 3A:
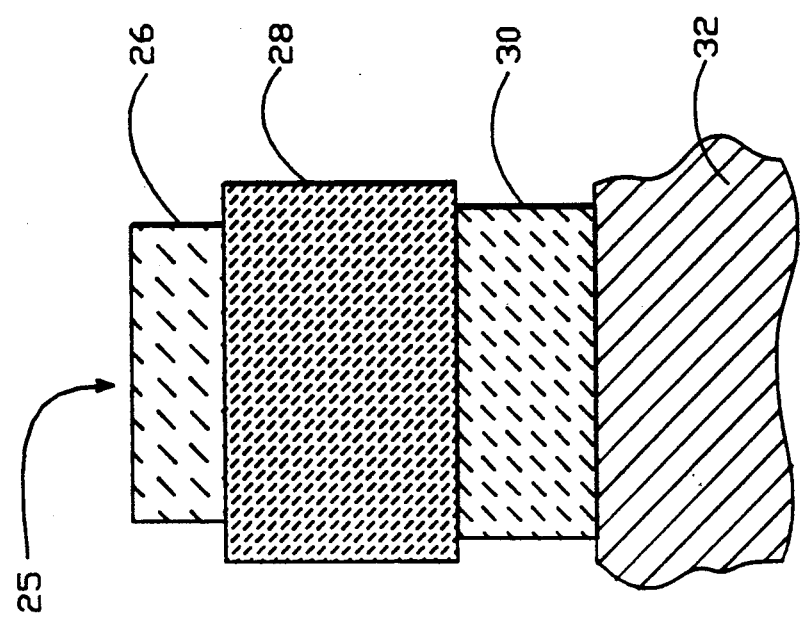

One of these structures, shown in FIG. 3A (wherein like reference numerals are used throughout the figures to refer to like parts), is described by Lockhart and King in "Three-Layered Reflection-Reducing Coatings", *J. Opt. Soc. Am.*, Vol. 37, pp. 689–94 (1947). The structure 25 comprises three films in which the outer film 26 has an optical thickness of approximately one-quarter wavelength in the visible spectrum and a refractive index less than that of the glass substrate 32 (n=1.52). The second film 28 has an optical thickness of one-half wavelength and a relatively high refractive index, e.g. on the order of 2.10. The third or inner film 30 has an optical thickness of one-quarter wavelength and a refractive index less than that of the half-wave film 28 but greater than glass substrate 32 on which the structure is deposited.

A modified structure 35, described in U.S. Pat. No. 3,432,225, which is hereby incorporated by reference, is shown in FIG. 3B. The modification consists of replacing film 30 adjacent substrate 32 with two films 34 and 36. The refractive index of film 34 is equal to that of the half-wave film 28. The other film 36 has a refractive index equal to the low index outer film 26. The thickness relationship of the films is altered slightly to optimize performance. Specifically, the optical thickness of films 26 and 28 remain about the same, while the optical thickness of films 34 and 36 are each about one-eighth of a wavelength at 520 nm (the design wavelength). The two-film substitution (films 34 and 36 for film 30) is effective not only in simulating the index of the film that has been replaced but provides an additional reflecting boundary which extends the effective spectral range of the structure. The total optical thickness of the structures of FIGS. 3A and 3B are very nearly the same.

Figure 4C:
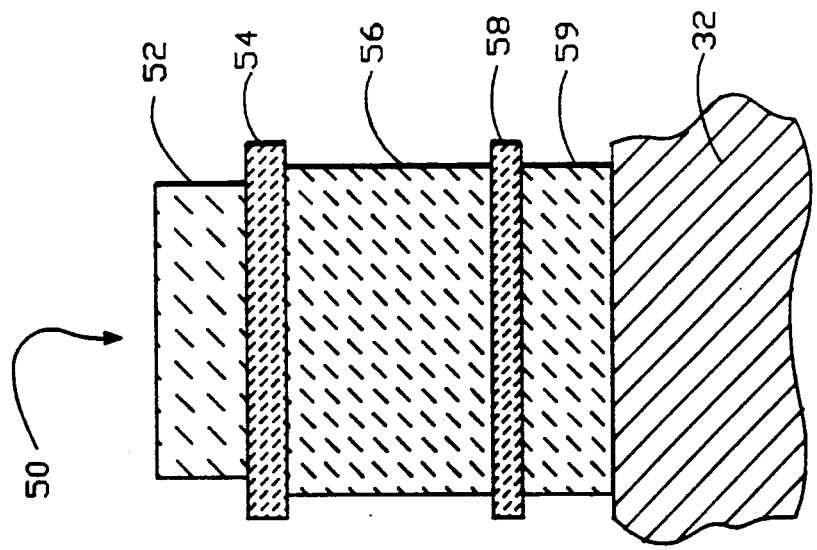
FIG. 4C schematically illustrates a preferred embodiment of the present invention.

The other basic structure, described by Macleod in *Thin Film Optical Filters*, Chap. 3, pp. 109–110, 2d Ed. (1986) which is hereby incorporated by reference, is similar to the Lockhart and King structure 25 (FIG. 3A) except that the high refractive index center film has an optical thickness of only one-quarter wavelength at the design wavelength. This structure may be referred to as the "triple-quarter design", and it is illustrated in FIG. 4A. As shown, the triple-quarter design 43 includes three films 42, 44 and 46, each having an optical thickness of about one-quarter wavelength at a wavelength of about 520 nm. The refractive index values for films 42, 44 and 46 may be about 1.46, 2.1 and 1.9, respectively.

The triple-quarter design provides a slightly narrower anti-reflection region than the Lockhart and King structure, and therefore, is rarely used today in its original form. Rather, the structure has been modified to improve spectral coverage. The modifications involve increasing the number of layers as well as the total thickness of the structure. In order to understand the novelty of the present invention, it is important to recognize a further significant difference between the triple-quarter design, and the Lockhart and King structure. This difference lies in the selection of the refractive index values for the films that make-up these structures.

The selection of the refractive index values in these two basic structures is a somewhat arbitrary process as there is no specific equation which determines what they should be. Designers are concerned with the spectral range over which the structure will be effective, the maximum reflection in that range, the variation of reflection in that range, and the average or some other weighted value of reflectance in that range. The relative importance of these parameters determines the choice of refractive index values.

For comparison purposes, a refractive index value of 1.46 is selected for the outer film for both structures 25 and 43. This is the typical value for silicon oxide ($SiO_2$) films. If the important design parameter was minimum total reflection in the visible spectrum, independent of variations with wavelength in that range, then the second film in the Lockhart and King structure 25 would have to have a refractive index of approximately 2.3. This value is significantly greater than the refractive index of zinc oxide. In the triple-quarter design, the second film would have a refractive index of about 2.1, which is closer to the value for zinc oxide, and the third film would have a refractive index of about 1.9, which is within the range of measured values shown in Table 1.

Substituting zinc oxide as the half wave film in the Lockhart and King structure would produce a far from satisfactory result as far as an anti-reflection coating is concerned. In the triple-quarter design, however, it could be made the third film and incorporated in the second film as a component of a mixture, or as a two or more layer substitution groups in conjunction with a higher index material such as titanium oxide. The total effective optical thickness of zinc oxide unfortunately would still be slightly less than one-half wavelength of visible light. The goal of the present invention is to provide a zinc oxide film thickness of at least approximately six-tenths of a wavelength of visible light in order to achieve the desired UV blocking levels.

The present invention allows the center film of a triple-quarter design to be replaced by a much thicker structure of two films having an effective optical thickness of about three-quarters of a wavelength. The sequence of the development is shown in FIGS. 4A, 4B, and 4C.

As discussed, FIG. 4A illustrates the triple-quarter design 43. FIG. 4B shows a similar three film o structure 45 in which the second film 44' has a three-quarter wavelength optical thickness instead of a one-quarter thickness. The sequence of refractive index values is the same as that of the structure FIG. 4A, i.e., the refractive index values of layers 42, 44' and 46 may be about 1.46, 2.1 and 1.9, respectively.

Figure 4B:
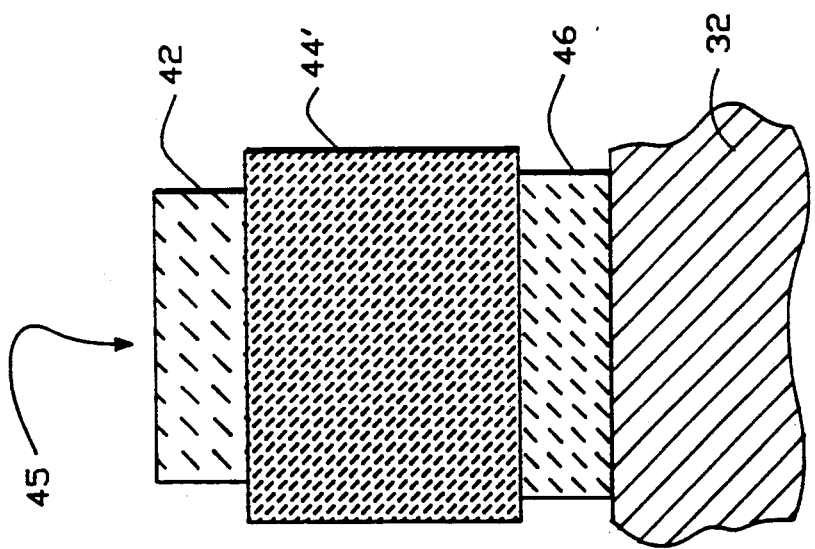
FIG. 4B schematically illustrates a modification of the structure of FIG. 4A.
Figure 4A:
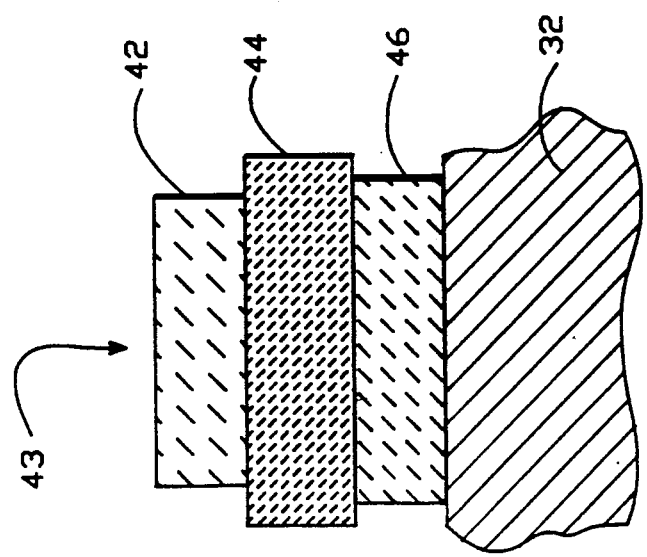
FIG. 4A schematically illustrates a multilayer, triple-quarter design.

It is noted at this point that a structure such as shown in FIG. 4B wherein second film 44' may be a homogeneous mixture of zinc oxide and a higher index material would not yield satisfactory anti-reflection performance. To illustrate this, the reflectance versus wavelength plots of structures 43 and 45 deposited on a glass surface having a refractive index of 1.52 have been computed. These plots are shown in FIG. 5. As can be seen, structure 43, represented by curve 62, provides anti-reflection properties less than one-half percent over the visible spectrum. It can be seen, however, that the reflectance characteristics of structure 45 (FIG. 4B), represented by curve 60, has a significantly reduced bandwidth, leaving the reflectivity of violet and red light unchanged. FIG. 4C shows a preferred embodiment of the present invention wherein films 44' and 46 of structure 45 of FIG. 4B are each replaced by two films. More specifically, structure 50 of FIG. 4C includes films 52, 54, 56, 58, and 59. Film or layer 52 corresponds to film 42 of structures 43 and 45 (see FIGS. 4A and 4B). Film 52 is formed of a material that has a refractive index between about 1.35 and 1.50. For example, $SiO_2$ (n=1.46) may be used. The optical thickness of film 52 at a wavelength ($\lambda$) of 520 nm is about one-quarter of a wavelength. Film 54 is formed of a high refractive index material, those having a refractive index of between about 2.15 and 2.60. Exemplary materials are titanium oxide (n=2.35) and oxides of cerium. The optical thickness of layer 54 is less than about one-quarter of a wavelength at 520 nm. Preferably, layer 54 does not exceed one-quarter of a wavelength in optical thickness. Layer 58 is also formed of a high refractive index material, such as $TiO_2$ or oxides of cerium. The optical thickness of layer 58 at 520 nm is also less than about one-eighth of a wavelength.

Films 56 and 59 are formed of zinc oxide (n is approximately equal to 1.9). The total thickness of these films is greater than that of films 54 and 58. The total optical thickness of the zinc oxide films is very close to a desired value of one-full wavelength of visible light. Specifically, layer 56 may have an optical thickness of about sixth-tenths of a wavelength at 520 nm, and layer 59 about one-quarter of a wavelength at 520 nm.

In the preferred embodiment, layer 59 is zinc oxide and layer 58 titanium oxide. However, other materials may be utilized so long as one of the layers has a refractive index different from ZnO. More specifically, layer 59 adjacent substance 32 must have a refractive index greater than the refractive index of the substrate but less than the refractive index of layer 58. Additionally, the refractive index of layer 58 is preferably between about 2.15 and 2.6. Further, the optical thickness of layers 58 and 59 at a wavelength of about 520 nm should be less than about one-quarter and one-third of a wavelength, respectively.

Exemplary layer thicknesses and materials for structure 50 are provided in Table 2.

TABLE 2

| Layer #<br>Incident Medium (Air) | Material | Index (n) | Optical Thickness at $\lambda$ = 520 nm |
| --- | --- | --- | --- |
| 1 | $SiO_2$ | 1.46 | 0.28122 $\lambda$ |
| 2 | $TiO_2$ | 2.35 | 0.08619 $\lambda$ |
| 3 | ZnO | 1.90 | 0.63960 $\lambda$ |
| 4 | $TiO_2$ | 2.35 | 0.12697 $\lambda$ |
| 5 | ZnO | 1.90 | 0.29519 $\lambda$ |

Substrate (Glass n = 1.52)

This embodiment is preferred because of its simplicity and its ready adaptability to deposition by a large-scale, DC magnetron reactive sputtering operations.

Figure 1:
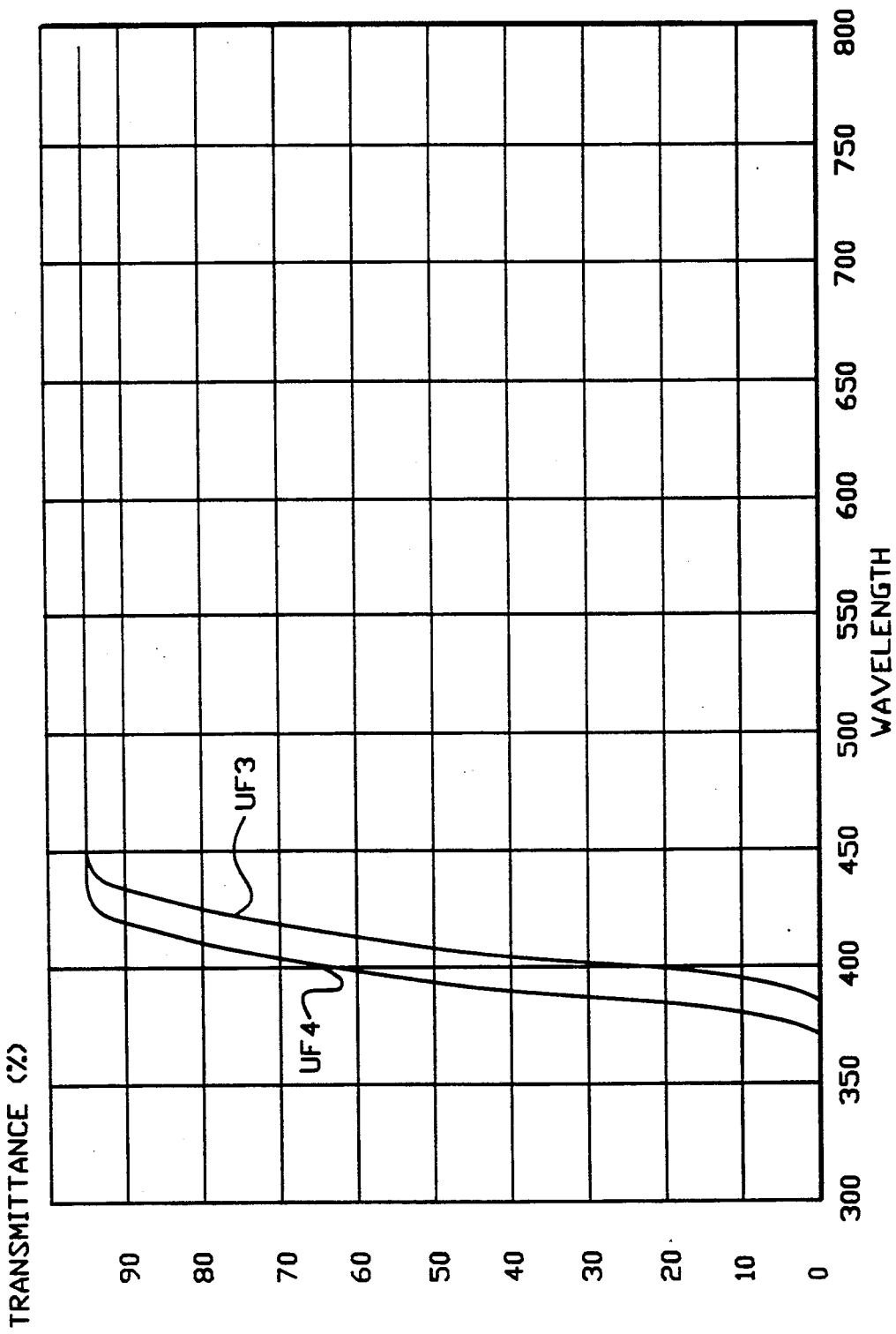
FIG. 1 is a graph illustrating transmission values for certain UV absorbing plastic materials.

FIG. 6A illustrates the reflectance versus wavelength plot (curve 64) for the structure of Table 2 deposited on one surface of a glass substrate having a refractive index of about 1.52. The transmission versus wavelength plot (curve 66) through the structure and the glass is shown in FIG. 6B. As can be seen from FIG. 6B, the UV blocking property of structure 50 compares with that of the Rohm and Hass UV blocking plastic material UF 4 (see FIG. 1).

The photopic reflectance of structure 50 is approximately 0.25 percent. The modulation of the actual reflection value across the visible spectrum would impart a bluish purple color to the reflected light. Other more complex embodiments of the invention can further reduce the photopic reflectivity and the color of the reflected light without any compromise in the UV blocking performance. These are described below.

For example, it would be possible to substitute a lower refractive index material for the silicon oxide of layer 52 of structure 50. A layer of magnesium fluoride (MgF$_2$) with a refractive index equal to about 1.38 and an optical thickness of about one-quarter wavelength at 520 nm could be used. The thickness of the remaining films would of course require some readjustment to yield an optimum result. The reflectance versus wavelength plot would be similar to curve 64 of FIG. 6A with the exception that the reflection maxima 63 and 65 would be somewhat lower in value. The bandwidth, as defined by the difference between the wavelengths 67 and 69 at which the reflectivity of the system is about 0.5 percent, would also be slightly narrower. The transmission curve would be similar to curve 66 of FIG. 6B.

In the discussions of the prior art, it was noted that the triple-quarter design does not offer unique solutions to determine the refractive index values for the films, and that such values are determined from compromises between effective bandwidth and reflectivity level. If the system were restricted to a triple-quarter design, and further restricted in that the third film must be zinc oxide it would not yield as near an optimum compromise as would the triple-quarter design with a magnesium fluoride outer film and with a free choice of materials for the remaining two films.

Figure 7:
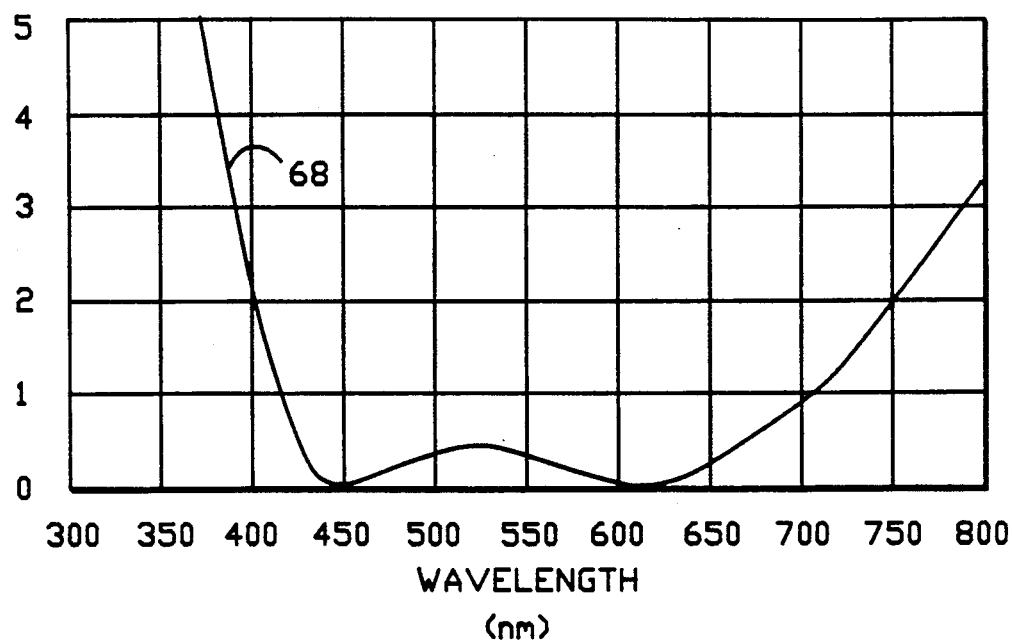
FIG. 7 is a graph illustrating reflectance values for a structure as shown in FIG. 4A.

Curve 68 of FIG. 7 illustrates the reflectance of a standard triple-quarter design (see FIG. 4A) wherein the refractive indices of the first, second and third films are 1.38, 1.92 and 1.82, respectively. The wavelength at which the films have an optical thickness of one-quarter wavelength is 520 nm. The improvement in reflection performance compared with the performance shown by curve 62 of FIG. 5, structure 43 (FIG. 4A) using SiO$_2$ as an outer film, can be seen. Significant, however, is the fact that the value for the refractive index of the third film (n=1.82) in this triple-quarter wave design is less than the value for zinc oxide.

Figure 8A:
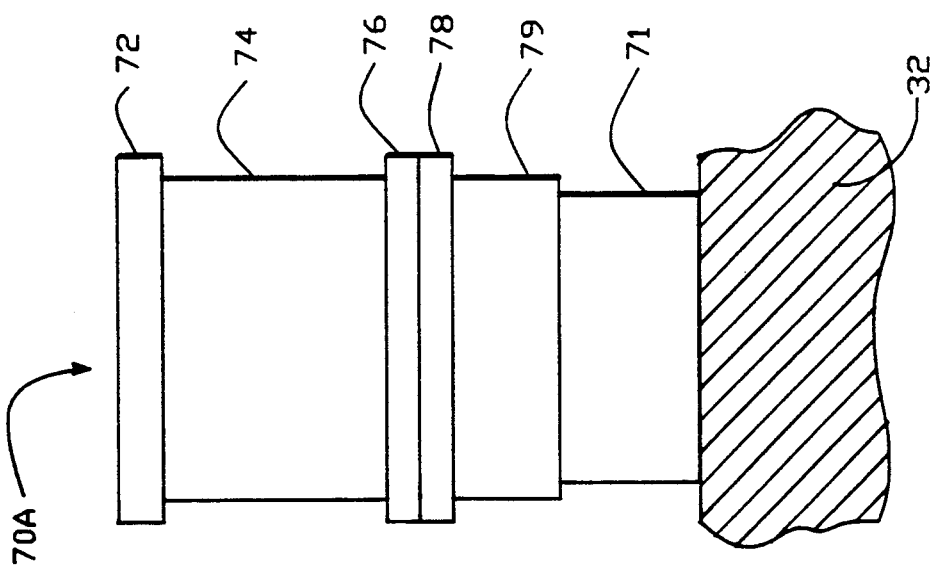
FIG. 8A schematically illustrates a modification of the embodiment of FIG. 8 including a sixth layer.
Figure 8:
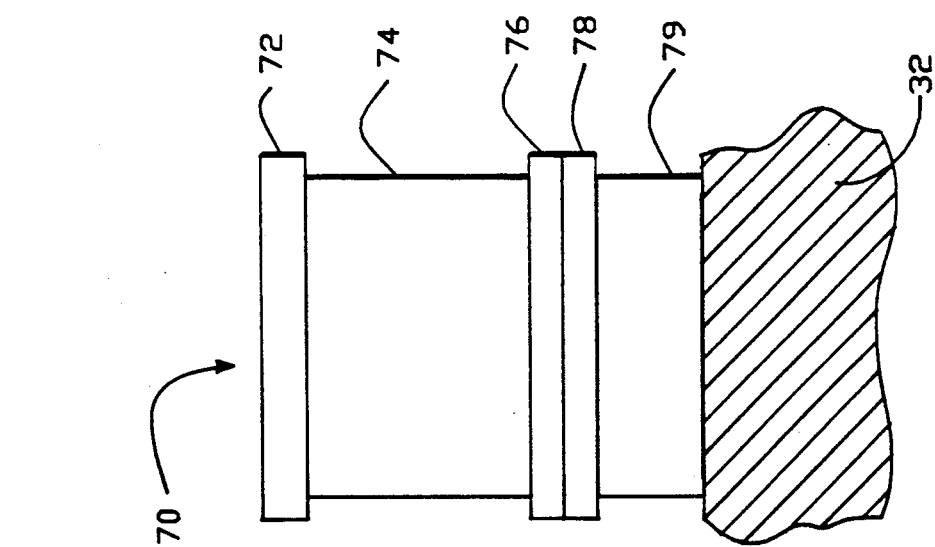
FIG. 8 schematically illustrates another embodiment of the present invention.

Another embodiment of the present invention is illustrated in FIG. 8. This structure 70 provides lower reflectivity and a wider bandwidth. However, it is not as desirable as structure 50, since it is not amenable to deposition by DC magnetron sputtering. The TiO$_2$ film 58 at the fourth position in the preferred embodiment of structure 50 is replaced with SiO$_2$ (n=1.46). This allows the fourth and fifth films, layers 78 and 79, respectively, to simulate a refractive index lower than that of ZnO. As such, the refractive index of layer 79 should be greater than that of both layer 78 and substrate 32. The optical thickness of layer 79 at a wavelength of about 520 nm is less than one-quarter of a wavelength, and the optical thickness of layer 78 at this same design wavelength is between about one-eighth and one-sixteenth of a wavelength. To further maximize performance, the positions of the second and third films of the preferred embodiment are reversed. Thus, second layer 74 of structure 70 is ZnO (n=1.9) with an optical thickness of at least about three-quarters of a wavelength. The third layer 76 has a refractive index greater than ZnO. Preferably, the index of refraction of layer 76 is between about 2.15 and 2.60, and its optical thickness at 520 nm is less than one-eighth of a wavelength but greater than one-sixteenth of a wavelength. The outer layer 72 has an index of refraction between about 1.35 and 1.50 and an optical thickness at 520 nm of about one-quarter of a wavelength.

Figure 9:
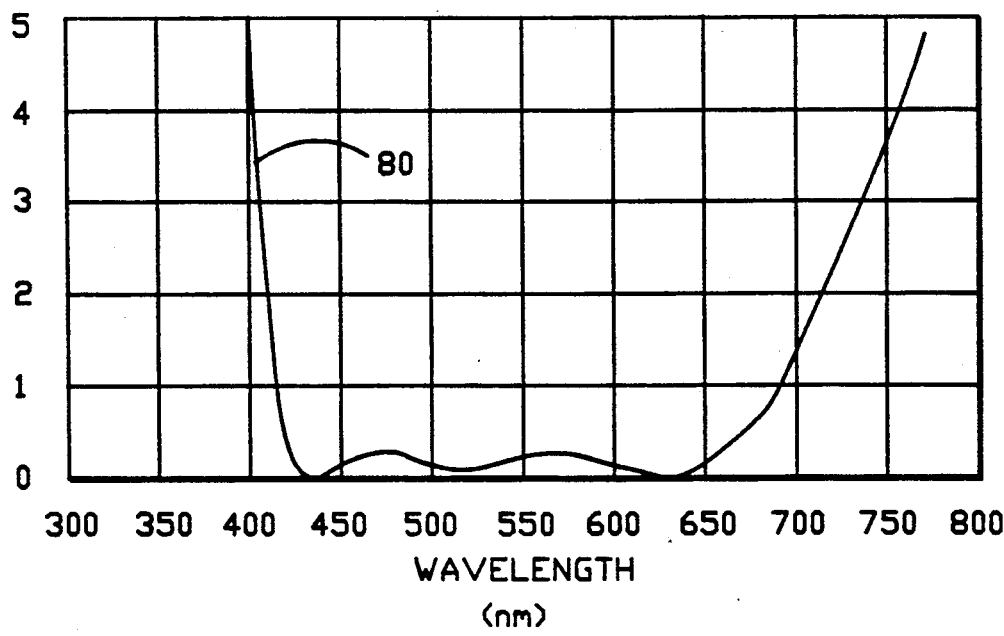
FIG. 9 is a graph illustrating reflectance values for the structure of FIG. 8.

Exemplary material and thickness details of structure 70 are shown in Table 3. The reflection versus wavelength curve 80 for the structure is shown in FIG. 9.

TABLE 3

| Layer # Incident Medium (Air) | Material | Index (n) | Optical Thickness at $\lambda$ = 520 nm |
|---|---|---|---|
| 1 | MgF$_2$ | 1.38 | 0.25560 $\lambda$ |
| 2 | ZnO | 1.90 | 0.84540 $\lambda$ |
| 3 | TiO$_2$ | 2.35 | 0.09885 $\lambda$ |
| 4 | SiO$_2$ | 1.46 | 0.07197 $\lambda$ |
| 5 | ZnO | 1.90 | 0.15111 $\lambda$ |

Substrate (Glass n = 1.52)

It is recognized, of course, that the low index film at fourth layer 78 need not be SiO$_2$ but could be some material with an index lower or higher than SiO$_2$ but lower than ZnO. Layer thickness relationships would then need adjustment to optimize the performance for whatever material was chosen.

In the forgoing embodiment, the positions of the second and third films in the preferred embodiment of the design were interchanged to optimize spectral performance. An embodiment of the design is possible in which the TiO$_2$ film of structure 70 is simply omitted and the other layer thicknesses adjusted to achieve optimum performance. In this embodiment, the ZnO film of the second layer must be increased in optical thickness to slightly more than a whole wavelength at 520 nm. Additionally, the first layer of material would have an index of refraction of between 1.35 and 1.5 and an optical thickness at a wavelength of about 520 nm of about one-quarter of a wavelength. The third layer would have an index of refraction less than ZnO and an optical thickness at a wavelength of about 520 nm of between about one-sixteenth and one-eighth of a wavelength. The fourth layer would have an index of refraction greater than the substrate as well as the third layer, and an optical thickness at a wavelength of about 520 nm of between about one-sixteenth and one-eighth of a wavelength. The details of such a structure are shown in Table 4.

TABLE 4

| Layer # Incident Medium (Air) | Material | Index (n) | Optical Thickness at $\lambda$ = 520 nm |
|---|---|---|---|
| 1 | MgF2 | 1.38 | 0.253121 $\lambda$ |
| 2 | ZnO | 1.90 | 1.044721 $\lambda$ |
| 3 | SiO$_2$ | 1.46 | 0.083751 $\lambda$ |
| 4 | ZnO | 1.90 | 0.069962 $\lambda$ |

Substrate (Glass n = 1.52)

The reflection versus wavelength curve 82 for the structure is shown in FIG. 10. The inferior performance of this structure compared with structure 70 is evident and reflects on the earlier discussion about the difficulty of using this type of structure as a starting point for a design containing a substantial thickness of ZnO.

Macleod in *Thin Film Optical Filters*, Chap. 3, pp. 110–112, 2d. Ed. (1986) teaches that the performance of the triple-quarter design can be improved by adding a half-wavelength thick film, which has a refractive index lower than that of the substrate, between the three-quarter wave films 42, 44 and 46 (see FIG. 4A) and the substrate 32. See also U.S. Pat. No. 3,781,090, which is hereby incorporated by reference.

Similarly, embodiments of the present invention may be modified by the inclusion of such an additional layer next to the substrate. Thus, the number of films would be increased from five to six. The additional film would have an optical thickness at 520 nm of about one-half wavelength and, as noted, a refractive index value less than the substrate. To maximize the benefit of using this additional thick low index film, film thickness relationship should be modified, and the final thickness of the additional low index layer may deviate slightly from the half-wavelength optical thickness.

Figure 4D:
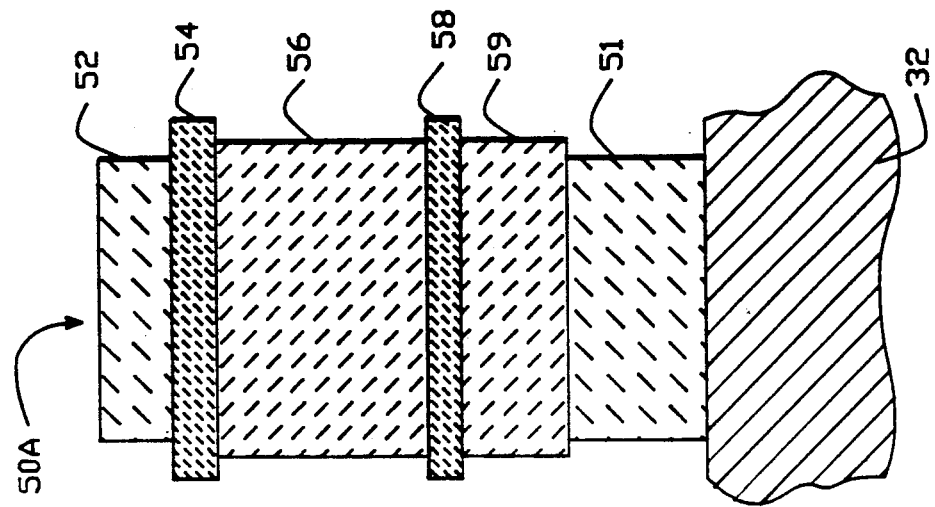
FIG. 4D schematically illustrates a modification of the embodiment of FIG. 4C including a sixth layer.

To illustrate this, structure 70 may be modified to include a low index film, approximately one-half wavelength optical thickness at 520 nm, next to substrate 32, i.e., in the sixth position according to the convention used herein. The modified structure 70A including a sixth layer 71 is illustrated in FIG. 8A. In the embodiment disclosed herein, the sixth layer may be MgF$_2$ (n=1.38). This structure is detailed in Table 5, and its reflection versus wavelength plot (curve 84) is shown in FIG. 11. As noted, the additional layer could also be incorporated in other embodiments of the present invention. For example, FIG. 4D shows structure 50 modified to structure 50A by the addition of a sixth layer 51.

TABLE 5

| Layer #<br>Incident Medium (Air) | Material | Index (n) | Optical Thickness at $\lambda$ = 520 nm |
|---|---|---|---|
| 1 | MgF$_2$ | 1.38 | 0.25302 $\lambda$ |
| 2 | ZnO | 1.90 | 0.80730 $\lambda$ |
| 3 | TiO$_2$ | 2.35 | 0.12588 $\lambda$ |
| 4 | SiO$_2$ | 1.46 | 0.06474 $\lambda$ |
| 5 | ZnO | 1.90 | 0.16981 $\lambda$ |
| 6 | MgF$_2$ | 1.38 | 0.53494 $\lambda$ |

Substrate (Glass n = 1.52)

The structures described above were optimized using digital computer techniques. It should be recognized that such designs afford a certain flexibility in the choice of film thicknesses depending on the parameters set for the optimization. In the above structures, the optimization parameter was set to be a reflectivity as close to zero as possible between wavelengths of 425 nm and 675 nm, consistent with the minimum variation of reflectivity within this wavelength range. Setting different targets for optimization comprising a compromise between the range of effectiveness of the anti-reflection property, and the value and variation in that range, would yield slightly different results in each of the embodiments described.

The embodiments of the present invention described above are capable of providing UV blocking and anti-reflection capabilities with a single surface coating. The other surface of a glass article, sheet or plate is, therefore, available to receive other surface treatments. Of course, the surface may be left untreated for reasons of economy, or to reduce the perceptibility of the reflection color. Examples of other surface treatments include: another coating according to the present invention for the purpose of improving UV blocking at longer wavelengths; a multilayer, anti-reflection coating not necessarily having UV blocking properties; a multilayer, anti-reflection coating to complement the UV blocking, anti-reflection coating, and to provide for reduced reflection without perceptible reflection color; a multilayer, anti-reflection coating with infrared blocking properties; a surface etch treatment to reduce reflected glare or perceptible reflection color; a neutral density coating for reducing the intensity of transmitted radiation; or a selective reflector or absorbing coating for changing the transmission color for aesthetic or cosmetic reasons.

The coating of the present invention may have various uses. For instance, it may be utilized for an art, photographic, architectural, or automotive glazing, or for an ophthalmic lens.

It is recognized that a skilled practitioner of the art, once having learned the basic principles of incorporating relatively large thicknesses of zinc oxide in an anti-reflection coating, as taught herein, would probably require only time and patience to add embellishments or modifications to the basic invention. Such embellishments might include: subdivision of individual films into two or more different components either for the purpose of simulating a certain refractive index value as taught in U.S. Pat. No. 3,565,509; or for the purpose of simulating graded indices or inhomogeneity as taught in U.S. Pat. No. 3,960,441.

The present invention has been described in terms of a number of embodiments. The invention, however, is not limited to the embodiments depicted and described. Rather, the scope of the invention is defined by the appended claims.

What is claimed is:

1. An anti-reflection coating formed on a surface of a substrate, comprising:

five layers, numbered consecutively beginning with the layer furthest from said substrate, wherein at least the third layer is zinc oxide having an optical thickness at a wavelength of about 520 nanometers of at least about six-tenths of a wavelength, and the four other layers each have an optical thickness at a wavelength of about 520 nanometers less than about one-third of a wavelength;

the first layer having an index of refraction less than that of said substrate;

the second and fourth layers having a refractive index greater than zinc oxide; and the fifth layer having a refractive index less than the fourth layer but greater than that of said substrate.

2. The coating of claim 1 further including another layer of material disposed between the fifth layer and said substrate wherein the index of refraction of said another layer is less than that of said substrate, and its optical thickness at a wavelength of about 520 nanometers is about one-half of a wavelength.

3. An anti-reflection coating formed on a surface of a substrate, comprising:

five layers, numbered consecutively beginning with the layer farthest from the substrate, wherein the second layer is zinc oxide having an optical thickness at a wavelength of about 520 nanometers of greater than about three-quarters of a wavelength, and the four other layers each having an optical thickness at a wavelength of about 520 nanometers less than or equal to about one-quarter of a wavelength;

the first layer having an index of refraction less than the substrate;

the third layer having an index of refraction greater than zinc oxide;

the fourth layer having an index of refraction less than zinc oxide; and the fifth layer having a refractive index greater than the substrate and greater than fourth layer.

4. An anti-reflection, coating formed on a surface of a substrate, comprising:

four layers, numbered consecutively beginning with the layer farthest from the substrate, wherein the second layer is zinc oxide having an optical thickness at a wavelength of about 520 nanometers of about one wavelength, and wherein the three other layers each have an optical thickness at a wavelength of about 520 nanometers less than or equal to about one-quarter of a wavelength;

the first layer having an index of refraction less than the substrate;

the third layer having an index of refraction different from less than zinc oxide; and the fourth layer having a refractive index greater than the third layer and greater than the substrate.

5. A coating formed on the surface of an article comprising:

a first layer of a material having an index of refraction between about 1.35 and 1.50 and an optical thickness at a wavelength of about 520 nanometers of about one-quarter of a wavelength;

a second layer of a material having an index of refraction between about 2.15 and 2.60 and an optical thickness at a wavelength of about 520 nanometers of less than about one-quarter of a wavelength;

a third layer of zinc oxide having an optical thickness at a wavelength of about 520 nanometers of about six-tenths of a wavelength;

a fourth layer of a material having an index of refraction between about 2.15 and 2.60 and an optical thickness at a wavelength of about 520 nanometers less than about one-quarter of a wavelength; and a fifth layer of a material having an index of refraction less than the index of refraction of the fourth layer but greater than the index of refraction of the article, and an optical thickness at a wavelength of about 520 nanometers of about one-third of a wavelength; said fifth layer being closest to the surface of the article.

6. The coating of claim 5 wherein the optical thickness of said second layer at a wavelength of about 520 nanometers does not exceed one-eighth of a wavelength.

7. The coating of claim 5 or 6 wherein said first layer is a layer of silicon oxide, said second and fourth layers are layers of titanium oxide, and said fifth layer is a layer of zinc oxide.

8. The coating of claim 5 further including another layer of material disposed between said fifth layer and the surface wherein the index of refraction is less than that of the article and its optical thickness at wavelength of about 520 nanometers is about one-half of a wavelength.

9. A coating formed on the surface of an article comprising:

a first layer of a material having an index of refraction between about 1.35 and 1.50 and an optical thickness at a wavelength of about 520 nanometers of about one-quarter of a wavelength;

a second layer of zinc oxide and having an optical thickness at a wavelength of about 520 nanometers of at least about three-quarters of a wavelength;

a third layer of a material having an index of refraction greater than zinc oxide and an optical thickness at a wavelength of about 520 nanometers between about one-eighth and one-sixteenth of a wavelength;

a fourth layer of a material having an index of refraction less than zinc oxide and an optical thickness at a wavelength of about 520 nanometers between about one-eighth and one sixteenth of a wavelength; and a fifth layer of a material having an index of refraction greater than that of the article and the fourth layer, and an optical thickness at a wavelength of about 520 nanometers less than about one-quarter of a wavelength, said fifth layer being closest to the surface of the article.

10. The coating of claim 9 wherein said first layer is a layer of magnesium fluoride, said third layer is a layer of titanium oxide, said fourth layer is a layer of silicon oxide, and said fifth layer is a layer of zinc oxide.

11. The coating of claim 9 further including another layer of material disposed between said fifth layer and the surface wherein the index of refraction of said another layer is less than that of the article and its optical thickness at a wavelength of about 520 nanometers is about one-half of a wavelength.

12. An anti-reflection coating formed on the surface of a substrate, comprising:

four adjacent layers, numbered consecutively beginning with the layer farthest from the substrate, including a layer of zinc oxide for blocking wavelengths shorter than about 375 nanometers;

said first layer having an index of refraction between about 1.35 and 1.5 and an optical thickness at a wavelength of about 520 nanometers of about one-quarter of a wavelength;

said second layer being said layer of zinc oxide and having an optical thickness at a wavelength of about 520 nanometers of about one wavelength;

said third layer having an index of refraction less than zinc oxide and an optical thickness at a wavelength of about 520 nanometers between about one-eighth and one-sixteenth of a wavelength; and said fourth layer having an index of refraction greater than that of the substrate and said third layer and an optical thickness at a wavelength of about 520 nanometers between about one-eighth and one sixteenth of a wavelength.

13. The coating of claim 12, wherein said first layer is a layer of magnesium fluoride, said third layer is a layer of silicon oxide, and said fourth layer is a layer of zinc oxide.

14. The coating of claim 12 further including another layer of material disposed between said fourth layer and the substrate wherein the index of refraction of said another layer is less than that of the substrate, and its optical thickness at a wavelength of about 520 nanometers is about one-half of a wavelength.

15. The coating of claims 5, 9 or 12 wherein said article comprises a substantially optically transparent substrate having two surfaces and the coating is formed on one surface of said substrate.

* * * * *

UNITED STATES PATENT AND TRADEMARK OFFICE
CERTIFICATE OF CORRECTION

PATENT NO. : 5,147,125

DATED : September 15, 1992

INVENTOR(S) : R. Russel Austin

It is certified that error appears in the above-identified patent and that said Letters Patent is hereby corrected as shown below:

In Claim 4, Column 13, line 9, delete the comma between "anti-reflection" and "coating";

In Claim 4, Column 13, lines 21-22, please delete "different from".

Signed and Sealed this

Fifth Day of October, 1993

Attest:

BRUCE LEHMAN

Attesting Officer

Commissioner of Patents and Trademarks